(12) United States Patent
Song (10) Patent No.: US 10,948,748 B2
(45) Date of Patent: Mar. 16, 2021

(54) APPARATUS AND DEVICE FOR APPLYING VOLTAGE TO SUBSTRATE

(71) Applicants: HKC Corporation Limited, Shenzhen (CN); Chongqing HKC Optoelectronics Technology Co., Ltd., Chongqing (CN)

(72) Inventor: Li Song, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 370 days.

(21) Appl. No.: 16/082,876

(22) PCT Filed: Jan. 22, 2018

(86) PCT No.: PCT/CN2018/073600
§ 371 (c)(1),
(2) Date: Sep. 6, 2018

(87) PCT Pub. No.: WO2019/134195
PCT Pub. Date: Jul. 11, 2019

(65) Prior Publication Data
US 2019/0302494 A1    Oct. 3, 2019

(30) Foreign Application Priority Data

Jan. 5, 2018  (CN) .......................... 201810012297.1

(51) Int. Cl.
*G02F 1/1337*  (2006.01)
*G02F 1/13*    (2006.01)

(52) U.S. Cl.
CPC .......... *G02F 1/1303* (2013.01); *G02F 1/1337* (2013.01); *G02F 1/133788* (2013.01)

(58) Field of Classification Search
CPC .......................... G02F 1/1303; G02F 1/1337
(Continued)

(56) References Cited

U.S. PATENT DOCUMENTS

2015/0044931 A1*  2/2015  Mo .................. G02F 1/1303
                                                  445/6

FOREIGN PATENT DOCUMENTS

CN    101887180 A    11/2010
CN    201796208 U    4/2011
(Continued)

OTHER PUBLICATIONS

International Search Report and Written Opinion dated Oct. 11, 2018, in International Application No. PCT/CN2018/073600.

*Primary Examiner* — Christopher M Raabe
(74) *Attorney, Agent, or Firm* — Muncy, Geissler, Olds & Lowe, PC (57) ABSTRACT

This application relates to an apparatus and a device for applying a voltage to a substrate. The apparatus for applying a voltage to a substrate includes: a plurality of movable voltage-application fixtures, including: a voltage-application unit, configured to electrically come into contact with a substrate, where a bottom of a base includes a linkage joining portion; and a transmission unit, including: a linkage structure, a rail structure, and a driving component, where the driving component may output power to drive the linkage structure, the linkage structure may perform a relative motion on the rail structure, and the linkage structure may be combined with the linkage joining portion, and drive, by means of a power output of the driving component, the voltage-application unit to move, so that the voltage-application probes move to a particular position to apply a voltage to the substrate.

20 Claims, 8 Drawing Sheets

(58) Field of Classification Search
USPC .......................................................... 445/62
See application file for complete search history.

(56) References Cited

FOREIGN PATENT DOCUMENTS

| | | |
|---|---|---|
| CN | 102621731 A | 8/2012 |
| CN | 104515914 A | 4/2015 |
| CN | 107037636 A | 8/2017 |
| CN | 207731055 U | 8/2018 |
| KR | 20120139084 A | 12/2012 |

\* cited by examiner

APPARATUS AND DEVICE FOR APPLYING VOLTAGE TO SUBSTRATE

BACKGROUND

Technical Field

This application relates to an apparatus and a device for applying a voltage to a substrate, and in particular, to an apparatus and a device for applying a voltage to a substrate having a movable voltage-application fixture.

Related Art

In a manufacturing process of a liquid crystal panel, ultraviolet main curing (UVM) plays a key role in an alignment process of liquid crystals. The basic principle of the UVM is: After a substrate of the liquid crystal panel is conveyed to a UVM machine table, a voltage is applied to liquid crystals in the substrate to deflect the liquid crystals; next, ultraviolet irradiation is applied to the liquid crystals, so that Monomer and PI films in the liquid crystal react, and liquid crystal molecules always form a preset liquid crystal tilt; then, ultraviolet exposure is performed on the liquid crystal panel; and then, the alignment process may be completed.

At present, an alignment ultraviolet liquid crystal irradiation apparatus applies a voltage to a substrate by using a probe installed on a voltage-application fixture to come into contact with a voltage-application terminal on the substrate. However, due to different sizes of substrate products, that voltage-application terminals of the products are at a same position cannot be ensured during product design. In addition, at present, the voltage-application fixture is fixed, by using a fixing screw lock, on a base of an apparatus for applying a voltage to a substrate. Therefore, positions of voltage-application fixtures cannot be adjusted according to different products. Consequently, the voltage-application fixture of each product cannot be shared, and each time a new product is developed, a new voltage-application fixture needs to be purchased, increasing design costs.

In a production and manufacturing process, when a production line changes a product to be produced, because the voltage-application fixture cannot be shared, the production line needs to change the voltage-application fixture, increasing workload of staff and a line-changing time of the production line, and further wasting productivity and increasing a risk of an actual yield loss.

SUMMARY

To resolve the foregoing technical problem, an objective of this application is to provide an apparatus and a device for applying a voltage to a substrate, and in particular, to provide an apparatus and a device for applying a voltage to a substrate having a movable voltage-application fixture.

The technical problem to be resolved in this application is to change a distance between voltage-application fixtures by moving a voltage-application fixture and by using an apparatus for applying a voltage to a substrate having a movable voltage-application fixture, so that the apparatus for applying a voltage to a substrate may perform a voltage-application operation according to different sizes of products, to share the voltage-application fixture and reduce change operations on the voltage-application fixture.

The objective of this application may be further achieved and the technical problem of this application may be further resolved by using the following technical solutions:

This application provides an apparatus for applying a voltage to a substrate, comprising: a plurality of movable voltage-application fixtures, comprising: a voltage-application unit, comprising a base, wherein a probe mount protrudes from a bottom of the base, the probe mount comprises a plurality of voltage-application probes, the voltage-application probes are configured to electrically come into contact with a substrate, and the bottom of the base comprises a linkage joining portion; and a transmission unit, comprising: a linkage structure, a rail structure, and a driving component, wherein the driving component may output power to drive the linkage structure, the linkage structure may perform a relative motion on the rail structure, and the linkage structure may be combined with the linkage joining portion, and drive, by means of a power output of the driving component, the voltage-application unit to move, so that the voltage-application probes move to a particular position to apply a voltage to the substrate, wherein movement distances of the voltage-application units equally occupy the width of the apparatus for applying a voltage to a substrate.

In an embodiment of this application, the base has a supporting dock, a clamping cylinder, and an upper cover. The supporting dock is a facade extending from a side of the probe mount far away from the voltage-application probes, a top of the supporting dock extends the upper cover, the upper cover faces the probe mount in parallel, and the clamping cylinder is disposed between the upper cover and the probe mount, and is configured to drive the upper cover to move vertically, so as to change a relative distance between the upper cover and the probe mount to clamp the substrate.

In an embodiment of this application, the linkage structure comprises a belt and a slider. The slider performs a relative motion with its top combined with the linkage joining portion and with its bottom installed on the rail structure.

In an embodiment of this application, the rail structure is a linear rail.

In an embodiment of this application, the driving component is a motor.

In an embodiment of this application, the plurality of movable voltage-application fixtures is a first movable voltage-application fixture and a second movable voltage-application fixture, a driving component of the first movable voltage-application fixture and a driving component of the second movable voltage-application fixture are disposed on one side of the apparatus for applying a voltage to a substrate in a side-by-side manner, the driving component of the first movable voltage-application fixture is close to one side of the probe mount, and the driving component of the second movable voltage-application fixture is far away from one side of the probe mount.

In the foregoing embodiments of this application, the width of a linkage structure of the first movable voltage-application fixture is ½ of the width of the apparatus for applying a voltage to a substrate, and the width of a linkage structure of the second movable voltage-application fixture is the width of the apparatus for applying a voltage to a substrate.

In the foregoing embodiments of this application, linkage of the movable voltage-application fixtures is automatically adjusted by means of parameter setting, to change a relative distance between the first movable voltage-application jig and the second movable voltage-application jig.

The objective of this application may be further achieved and the technical problem of this application may be further resolved by using the following technical solutions:

This application provides a device for applying a voltage to a substrate, comprising: a bearer platform, configured to bear a substrate; and at least one pair of the foregoing apparatuses for applying a voltage to a substrate, respectively symmetrically disposed on two sides of the substrate.

After improvement in this application, during development of new products with different sizes, costs of purchasing and designing a new voltage-application jig can be reduced. For a production line, an actual yield risk caused due to the change of a voltage-application jig, workload of staff, and waste of the production time can be avoided, thereby improving production efficiency.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout the specification, "on" means that one is located above or below a target component and does not necessarily mean that one is located on the top based on a gravity direction.

To further describe the technical measures taken in the this application to achieve the intended application objective and effects thereof, specific implementations, structures, features, and effects of an apparatus and a device for applying a voltage to a substrate provided in this application are described in detail below with reference to the accompanying drawings and preferred embodiments.

Figure 1A:
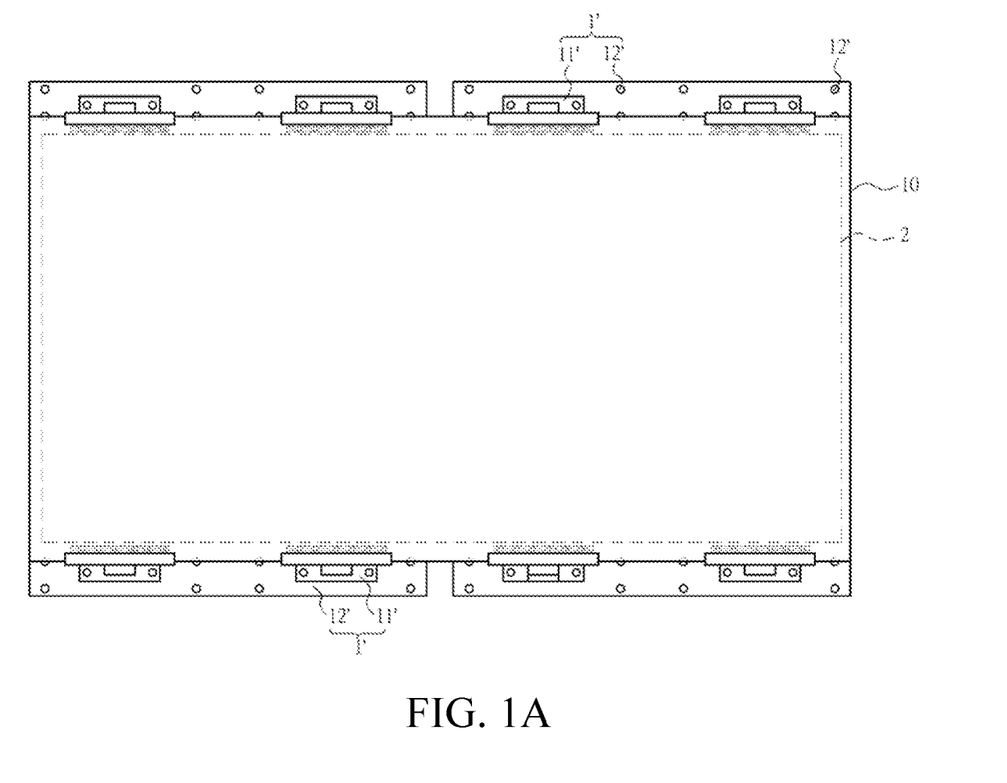
FIG. 1A is a schematic top view of an exemplary device for applying a voltage to a substrate.
Figure 1B:
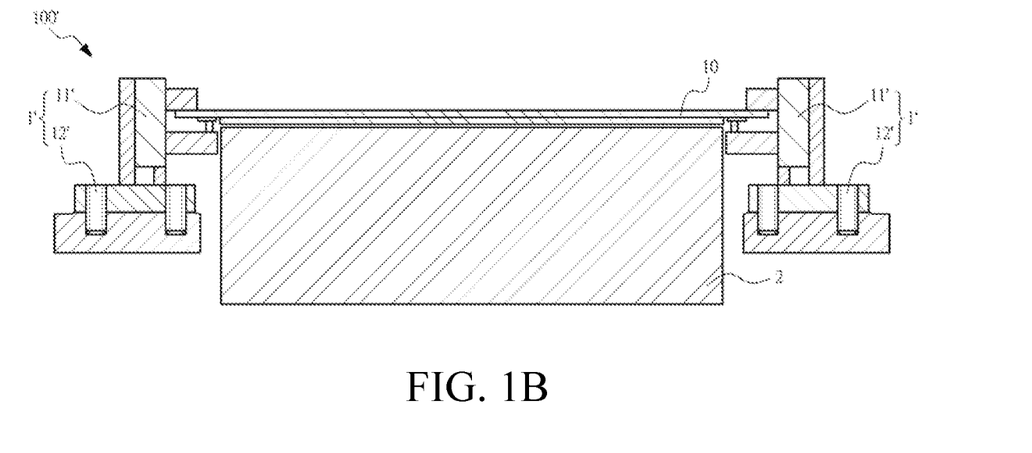
FIG. 1B is a schematic side view of an exemplary device for applying a voltage to a substrate.

First, referring to FIG. 1A and FIG. 1B, FIG. 1A and FIG. 1B are respectively a schematic top view and a schematic front view of an exemplary device 100' for applying a voltage to a substrate. As shown in the figures, a problem to be resolved in this application is that at present, for an alignment ultraviolet liquid crystal irradiation apparatus, a probe installed on a voltage-application jig 11' comes into contact with a substrate 10 on a bearer platform 2, and applies a voltage to the substrate 10 by using a voltage-application terminal on the substrate 10, but due to different product sizes of the substrate 10, that voltage-application terminals of products are at a same position cannot be ensured during product design. In addition, at present, the voltage-application jig 11' is fixed, by using a fixing screw 12', on a base of an apparatus 1' for applying a voltage to a substrate. Therefore, positions cannot be adjusted according to different products. Consequently, the voltage-application jig 11' of each product cannot be shared, and each time a new product is developed, a new voltage-application jig needs to be purchased, increasing design costs.

In a production and manufacturing process, when a production line changes a product to be produced, because the voltage-application jig 11' cannot be shared, the production line needs to change the voltage-application jig 11', increasing workload of staff and a line-changing time of the production line, and further wasting productivity and increasing a risk of an actual yield loss.

Figure 2A:
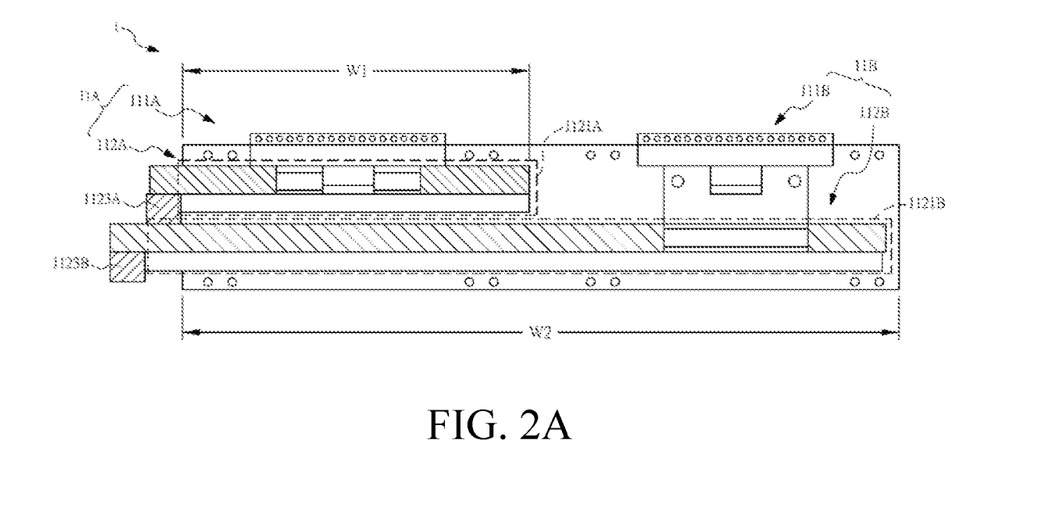
FIG. 2A is a schematic top view of an embodiment of an apparatus for applying a voltage to a substrate according to this application.
Figure 2B:
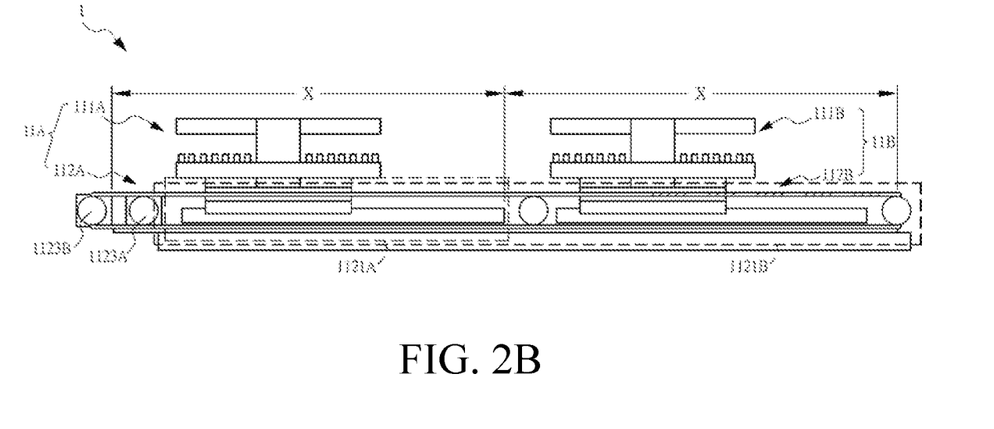
FIG. 2B is a schematic front view of an embodiment of an apparatus for applying a voltage to a substrate according to this application.
Figure 3A:
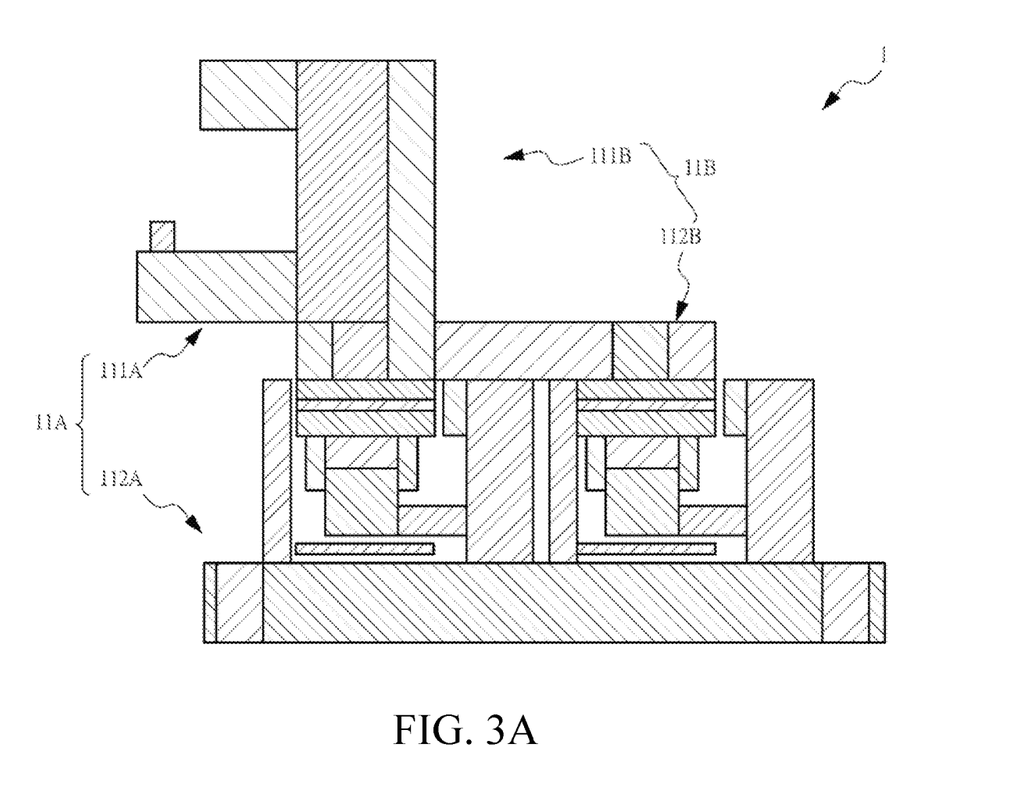
FIG. 3A is a schematic side view of a movable voltage-application jig according to this application.
Figure 3B:
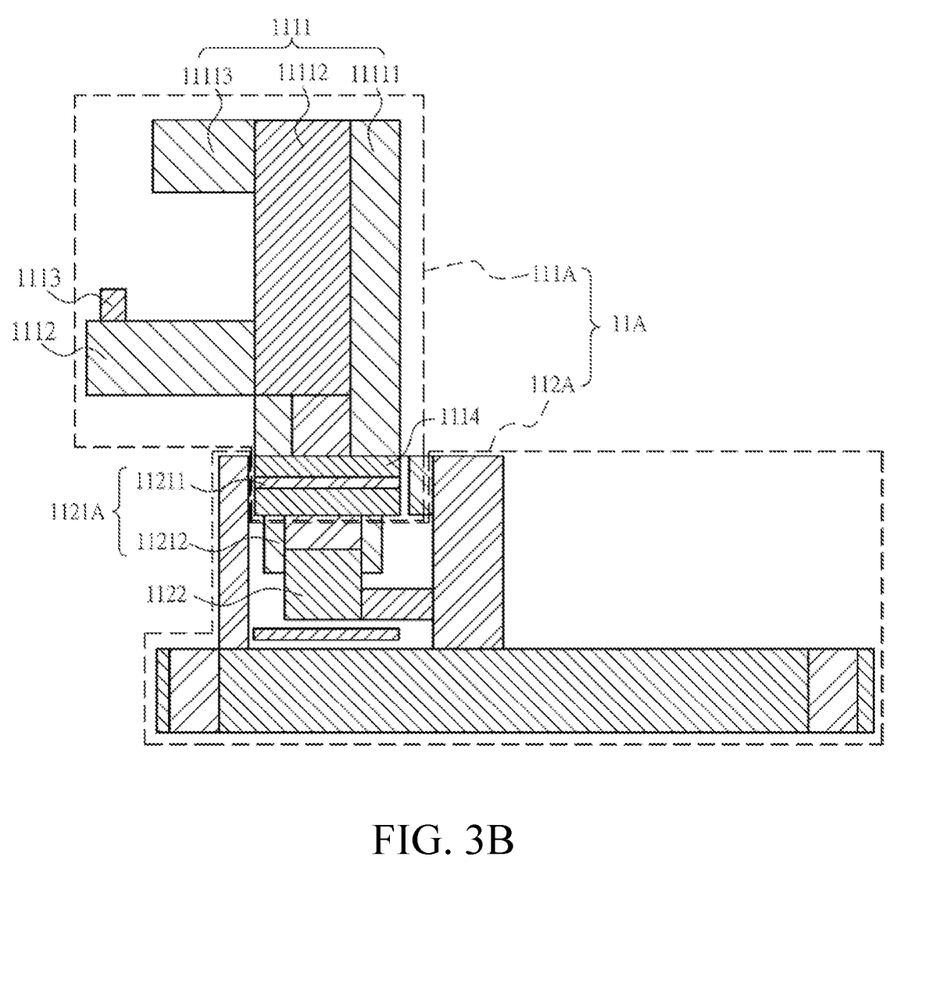
FIG. 3B is a schematic side view of a first movable voltage-application jig according to this application.
Figure 3C:
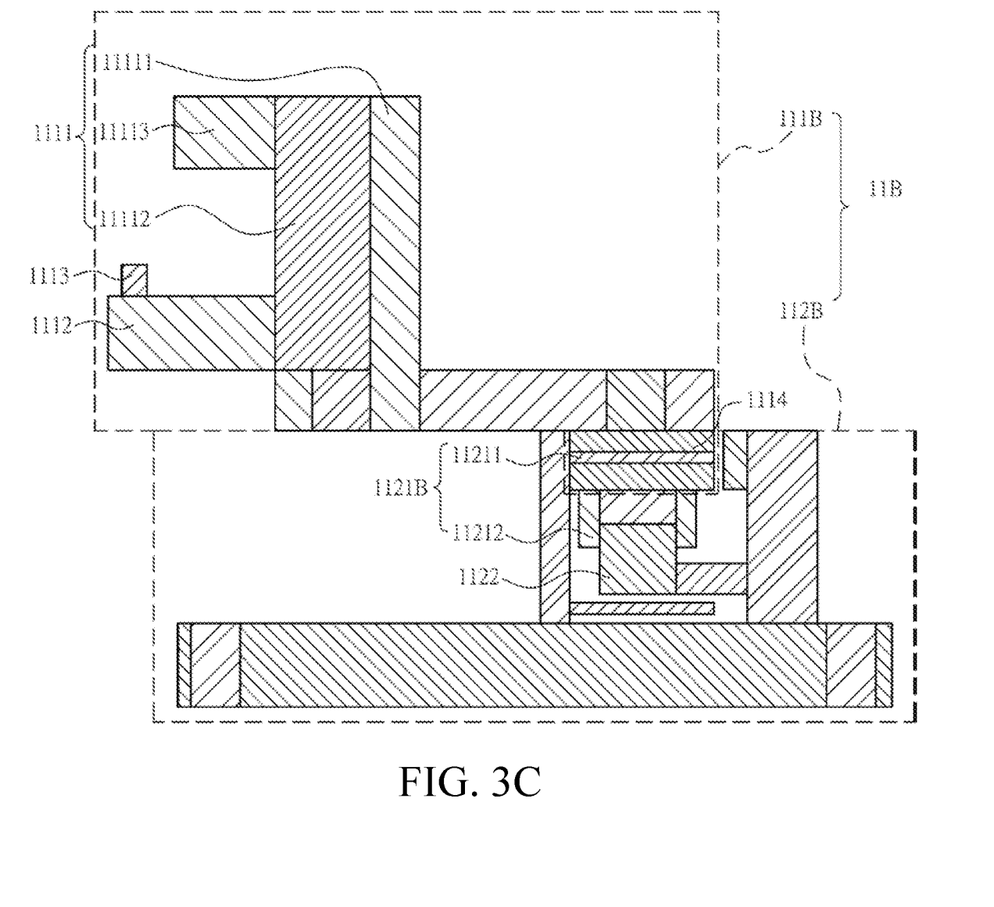
FIG. 3C is a schematic side view of a second movable voltage-application jig according to this application.

Referring to FIG. 2A to FIG. 3C, FIG. 2A and FIG. 2B are respectively a schematic top view and a schematic front view of an embodiment of an apparatus for applying a voltage to a substrate according to this application; and FIG. 3A to FIG. 3C are schematic side views of a movable voltage-application jig in an apparatus for applying a voltage to a substrate.

An objective of this application and a technical problem to be resolved in this application include: an apparatus 1 for applying a voltage to a substrate, including a plurality of movable voltage-application fixtures. During implementation, two movable voltage-application fixtures (a first movable voltage-application jig 11A and a second movable voltage-application jig 11B) are used as an example for description. A structure of the movable voltage-application jig includes: a voltage-application unit (voltage-application units 111A and 111B), including a base 1111, where a probe mount 1112 protrudes from a bottom of the base 1111, the probe mount 1112 includes a plurality of voltage-application probes 1113, the voltage-application probes 1113 are configured to electrically come into contact with a substrate 10, and the bottom of the base 1111 includes a linkage joining portion 1114 (111A shown in FIGS. 3B and 111B shown in FIG. 3C); and a transmission unit 112 (transmission units 112A and 112B), including: a linkage structure (linkage structures 1121A and 1121B), a rail structure 1122, and a driving component (driving components 1123A and 1123B), where the driving component may output power to drive the linkage structure, the linkage structure may perform a relative motion on the rail structure, and the linkage structure may be combined with the linkage joining portion 1114 (112A shown in FIGS. 3B and 112B shown in FIG. 3C), and drive, by means of a power output of the driving component, the voltage-application unit 111 to move, so that the voltage-application probes 1113 move to a particular position to apply a voltage to the substrate 10, where movement distances X of the voltage-application units 111 equally occupy the width of the apparatus 1 for applying a voltage to a substrate.

In this embodiment, the base 1111 has a supporting dock 11111, a clamping cylinder 11112, and an upper cover 11113 (as shown in FIG. 3B and FIG. 3C). The supporting dock 11111 is a facade extending from a side of the probe mount 1112 far away from the voltage-application probes 1113, a top of the supporting dock 11111 extends the upper cover 11113, the upper cover 11113 faces the probe mount 1112 in parallel, and the clamping cylinder 11112 is disposed between the upper cover 11113 and the probe mount 1112, and is configured to drive the upper cover 11113 to move vertically, so as to change a relative distance between the upper cover 11113 and the probe mount 1112 to clamp the substrate 10.

In this embodiment, as shown in FIG. 3B and FIG. 3C, the linkage structure (the linkage structures 11121A and 1121B) includes a belt 11211 and a slider 11212. The slider 11212 performs a relative motion with its top combined with the linkage joining portion 1114 and with its bottom installed on the rail structure 1122.

In this embodiment, the rail structure 1122 is a linear rail.

In this embodiment, the driving component (the driving components 1123A and 1123B) is a motor.

In this embodiment, the plurality of movable voltage-application fixtures is the first movable voltage-application jig 11A and the second movable voltage-application jig 11B, the driving component 1123A of the first movable voltage-application jig 11A and the driving component 1123B of the second movable voltage-application jig 11B are disposed on one side of the apparatus 1 for applying a voltage to a substrate in a side-by-side manner, the driving component 1123A of the first movable voltage-application jig 11A is close to one side of the probe mount 1112, and the driving component 1123B of the second movable voltage-application jig 11B is far away from one side of the probe mount 1112.

In this embodiment, the width W1 of the linkage structure 1121A of the first movable voltage-application jig 11A is ½ of the width of the apparatus 1 for applying a voltage to a substrate, the width W2 of the linkage structure 1121B of the second movable voltage-application jig 11B is the width of the apparatus 1 for applying a voltage to a substrate.

In this embodiment, linkage of the movable voltage-application fixtures is automatically adjusted by means of parameter setting, to change a relative distance between the first movable voltage-application jig 11A and the second movable voltage-application jig 11B (for example, a position parameter of a voltage-application jig of each product is set in a Recipe parameter, so that the motor automatically adjusts a position of the voltage-application unit 111 according to the set position parameter). A distance between the movable voltage-application fixtures is changed by using the transmission unit, so that the apparatus 1 for applying a voltage to a substrate may perform a voltage-application operation according to different sizes of products, to share a voltage-application fixture and reduce change operations on the voltage-application fixture.

Figure 4:
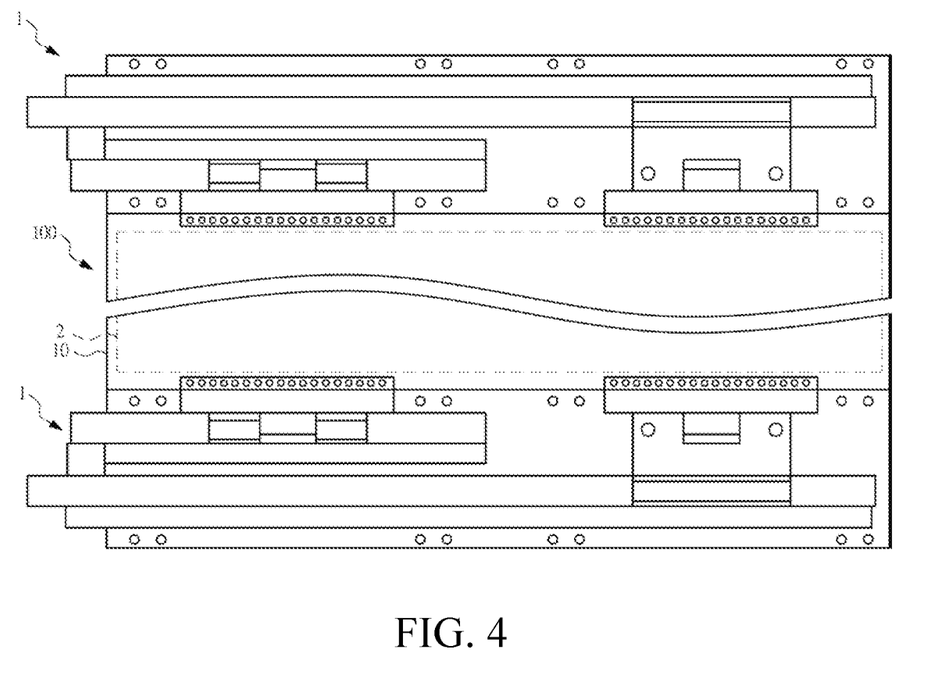
FIG. 4 is a schematic top view of an embodiment of a device for applying a voltage to a substrate according to this application.

Referring to FIG. 4, the apparatus 1 for applying a voltage to a substrate 1 in this application may be further symmetrically disposed in pairs, and form a device 100 for applying a voltage to a substrate together with a bearer platform 2. As shown in the figure, this application provides a device 100 for applying a voltage to a substrate, including: a bearer platform 2, configured to bear a substrate 10; and at least one pair of the foregoing apparatuses 1 for applying a voltage to a substrate 1, symmetrically disposed on two sides of the substrate 10.

The phrases such as "in some embodiments" and "in various embodiments" are repeatedly used. The wordings usually refer to different embodiments, but they may also refer to a same embodiment. The terms such as "comprise", "have", and "include", are synonyms, unless otherwise indicated in the context.

The foregoing descriptions are merely embodiments of this application, and are not intended to limit this application in any form. Although this application has been disclosed above in forms of embodiments, the embodiments are not intended to limit this application. Any person skilled in the art can make some variations or modifications, which are equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. An apparatus for applying a voltage to a substrate, comprising:
    a plurality of movable voltage-application fixtures, comprising:
    a voltage-application unit, comprising a base, wherein a probe mount protrudes from a bottom of the base, the probe mount comprises a plurality of voltage-application probes, the voltage-application probes are configured to electrically come into contact with a substrate, and the bottom of the base comprises a linkage joining portion; and
    a transmission unit, comprising: a linkage structure, a rail structure, and a driving component, wherein the driving component may output power to drive the linkage structure, the linkage structure may perform a relative motion on the rail structure, and the linkage structure may be combined with the linkage joining portion, and drive, by means of a power output of the driving component, the voltage-application unit to move, so that the voltage-application probes move to a particular position to apply a voltage to the substrate, wherein
    movement distances of the voltage-application units equally occupy the width of the apparatus for applying a voltage to a substrate.

2. The apparatus for applying a voltage to a substrate according to claim 1, wherein the base has a supporting dock, a clamping cylinder, and an upper cover.

3. The apparatus for applying a voltage to a substrate according to claim 2, wherein the supporting dock is a facade extending from a side of the probe mount far away from the voltage-application probes, a top of the supporting dock extends the upper cover, the upper cover faces the probe mount in parallel, and the clamping cylinder is disposed between the upper cover and the probe mount, and is configured to drive the upper cover to move vertically, so as to change a relative distance between the upper cover and the probe mount to clamp the substrate.

4. The apparatus for applying a voltage to a substrate according to claim 1, wherein the linkage structure comprises a belt and a slider.

5. The apparatus for applying a voltage to a substrate according to claim 4, wherein the slider performs a relative motion with its top combined with the linkage joining portion and with its bottom installed on the rail structure.

6. The apparatus for applying a voltage to a substrate according to claim 1, wherein the linkage structure is a linear rail.

7. The apparatus for applying a voltage to a substrate according to claim 1, wherein the driving component is a motor.

8. The apparatus for applying a voltage to a substrate according to claim 1, wherein the plurality of movable voltage-application fixtures is a first movable voltage-application fixture and a second movable voltage-application fixture, a driving component of the first movable voltage-application fixture and a driving component of the second movable voltage-application fixture are disposed on one side of the apparatus for applying a voltage to a substrate in a side-by-side manner, the driving component of the first movable voltage-application fixture is close to one side of the probe mount, and the driving component of the second movable voltage-application fixture is far away from one side of the probe mount.

9. The apparatus for applying a voltage to a substrate according to claim 8, wherein the width of a linkage structure of the first movable voltage-application fixture is ½ of the width of the apparatus for applying a voltage to a substrate, and the width of a linkage structure of the second movable voltage-application fixture is the width of the apparatus for applying a voltage to a substrate.

10. The apparatus for applying a voltage to a substrate according to claim 8, wherein linkage of the movable voltage-application fixtures is automatically adjusted by means of parameter setting, to change a relative distance between the first movable voltage-application fixture and the second movable voltage-application fixture.

11. An apparatus for applying a voltage to a substrate, comprising:
a plurality of movable voltage-application fixtures, comprising:
a voltage-application unit, comprising a base, wherein a probe mount protrudes from a bottom of the base, the probe mount comprises a plurality of voltage-application probes, and the bottom of the base comprises a linkage joining portion; and
a transmission unit, comprising: a linkage structure, a linear rail, and a motor, wherein the linkage structure comprises a belt and a slider, the motor may output power to drive the belt to drive the slider, a bottom of the slider may perform a relative motion on the linear rail, and a top of the slider may be combined with the linkage joining portion, and drive, by means of a power output of the motor, the voltage-application unit to move, wherein
motors of the movable voltage-application fixtures are disposed on a same side in a side-by-side manner, movement distances of the voltage-application units equally occupy the width of the apparatus for applying a voltage to a substrate, and a relative distance between the voltage-application units is automatically adjusted by means of parameter setting.

12. A device for applying a voltage to a substrate, comprising:
a bearer platform, configured to bear a substrate; and
apparatuses for applying a voltage to a substrate, comprising:
a plurality of movable voltage-application fixtures, comprising:
a voltage-application unit, comprising a base, wherein a probe mount protrudes from a bottom of the base, the probe mount comprises a plurality of voltage-application probes, the voltage-application probes are configured to electrically contact with a substrate, and the bottom of the base comprises a linkage joining portion; and
a transmission unit, comprising: a linkage structure, a rail structure, and a driving component, wherein the driving component may output power to drive the linkage structure, the linkage structure may perform a relative motion on the rail structure, and the linkage structure may be combined with the linkage joining portion, and drive, by means of a power output of the driving component, the voltage-application unit to move, so that the voltage-application probes move to a particular position to apply a voltage to the substrate, wherein
movement distances of the voltage-application units equally occupy the width of the apparatus for applying a voltage to a substrate; and
the apparatuses for applying a voltage to a substrate are symmetrically disposed on two sides of the substrate.

13. The device for applying a voltage to a substrate according to claim 12, wherein the base has a supporting dock, a clamping cylinder, and an upper cover, the supporting dock is a facade extending from a side of the probe mount far away from the voltage-application probes, a top of the supporting dock extends the upper cover, the upper cover faces the probe mount in parallel, and the clamping cylinder is disposed between the upper cover and the probe mount, and is configured to drive the upper cover to move vertically, so as to change a relative distance between the upper cover and the probe mount to hold the substrate.

14. The device for applying a voltage to a substrate according to claim 12, wherein the linkage structure comprises a belt and a slider.

15. The device for applying a voltage to a substrate according to claim 14, wherein the slider performs a relative motion with its top combined with the linkage joining portion and with its bottom installed on the rail structure.

16. The device for applying a voltage to a substrate according to claim 12, wherein the linkage structure is a linear rail.

17. The device for applying a voltage to a substrate according to claim 12, wherein the linkage structure is a motor.

18. The device for applying a voltage to a substrate according to claim 12, wherein the plurality of movable voltage-application fixtures is a first movable voltage-application fixture and a second movable voltage-application fixture, a driving component of the first movable voltage-application fixture and a driving component of the second movable voltage-application fixture are disposed on one side of the apparatus for applying a voltage to a substrate in a side-by-side manner, the driving component of the first movable voltage-application fixture is close to one side of the probe mount, and the driving component of the second movable voltage-application fixture is far away from one side of the probe mount.

19. The device for applying a voltage to a substrate according to claim 18, wherein the width of a linkage structure of the first movable voltage-application fixture is ½ of the width of the apparatus for applying a voltage to a substrate, and the width of a linkage structure of the second movable voltage-application fixture is the width of the apparatus for applying a voltage to a substrate.

20. The device for applying a voltage to a substrate according to claim 18, wherein linkage of the movable voltage-application fixtures is automatically adjusted by means of parameter setting, to change a relative distance between the first movable voltage-application fixture and the second movable voltage-application fixture.

* * * * *